United States Patent [19]

Matsushima et al.

[11] Patent Number: 5,600,193
[45] Date of Patent: Feb. 4, 1997

[54] MOTOR

[75] Inventors: Kenji Matsushima; Yukihiro Nagahori, both of Gyoda, Japan

[73] Assignee: Jeco Company Limited, Japan

[21] Appl. No.: 264,509

[22] Filed: Jun. 23, 1994

[30] Foreign Application Priority Data

Jun. 30, 1993 [JP] Japan .................................. 5-162923
May 27, 1994 [JP] Japan .................................. 6-114984

[51] Int. Cl.$^6$ ...................................................... H02K 11/00
[52] U.S. Cl. ................................................ 310/68 C; 310/71
[58] Field of Search .......................... 310/68 C, 40 MM, 310/71, 89

[56] References Cited

U.S. PATENT DOCUMENTS

| | | | |
|---|---|---|---|
| 3,095,515 | 6/1963 | Case et al. | 310/43 |
| 4,873,464 | 10/1989 | Wang | 310/71 |
| 5,010,264 | 4/1991 | Yamada et al. | 310/68 C |
| 5,140,205 | 8/1992 | Baines | 310/68 C |
| 5,227,685 | 7/1993 | Krouse | 310/71 |
| 5,294,852 | 3/1994 | Straker | 310/68 C |

FOREIGN PATENT DOCUMENTS

| | | |
|---|---|---|
| 1236061 | 3/1967 | Germany . |
| 2458991 | 7/1975 | Germany . |
| 3604584 | 4/1989 | Germany . |
| 8915266 | 6/1990 | Germany . |
| 9104028 | 10/1991 | Germany . |
| 2-41663 | 3/1990 | Japan . |

*Primary Examiner*—Clayton E. LaBalle
*Attorney, Agent, or Firm*—Andrus, Sceales, Starke & Sawall

[57] ABSTRACT

In a motor, there are provided, integral with a motor cover covering the opening of a motor case: arm holding parts for holding brush arms; a PTC holding part for holding a PTC such that the side thereof is in contact with the brush arm; a first hole into which a connecting wire body, which serves as an external circuit terminal, is inserted so as to come into contact with a connecting part of the brush arm, the connecting part of the brush arm touching a hypothetical curved surface extending from the inner wall of the first hole; and a second hole into which a connecting wire body, which serves as an external circuit terminal, is inserted so as to come into contact with the side of the PTC, the side of the PTC touching a hypothetical curved surface extending from the inner wall of the second hole.

13 Claims, 7 Drawing Sheets

MOTOR

BACKGROUND OF THE INVENTION

The present invention relates to motors, and more particularly to a motor in which brushes feed a current to a commutator of a rotor so as to produce an electrical field around the rotor, and the rotor is allowed to rotate by placing it in interaction with the magnetic field formed by a stator.

Small brush-type motors are used as part of electrical equipment in automobiles, such as an electrically controlled mirror or a power window.

In this kind of motor, connection between a brush and an external circuit is conventionally achieved via a brush arm and a terminal component. A brush arm is formed of a conductive material and has a brush fixed to the end thereof. The other end of the brush arm is fitted, for example, to a motor case. When a current is applied to the brush, the brush arm operates so as to press the brush against the commutator. The terminal component, which is fabricated separately from the brush arm, is connected to the brush arm at one end, and to an external circuit terminal extending from the external circuit at the other end, so that the connection between the brush arm and the external circuit terminal is achieved. In some motors of this kind, a thermistor having a positive temperature coefficient (that is, the thermistor which exhibits an increase in its resistance as the temperature rises) and a current feed line are connected in series in order to prevent the coil of the rotor from being burned by being overheated due to an excess current resulting from an overload or the like.

In a brush-type motor and a thermistor having a positive temperature coefficient, the thermistor having a positive temperature coefficient is connected between the brush arm and the terminal component so as to make the motor as compact as possible.

However, the construction of the conventional motor in which the external circuit terminal and the brush are connected to each other via separately fabricated parts, that is, the brush arm and the terminal component, calls for holding the brush arm and the terminal component in their respective positions and providing necessary connections individually. Hence, inconvenience is encountered during the assembly. Since a space for accommodating the terminal component is required, an effort to make the motor more compact is thwarted, and the cost of producing the motor tends to be high. Since a thermistor is required in addition to the brush arm and the terminal component in a brush-type motor having a thermistor built in, the overall construction becomes even more complex. This results in the increase in possible causes of failure, the increase in the production cost, and inconvenience encountered during the assembly.

SUMMARY OF THE INVENTION

Accordingly, a general object of the present invention is to provide a motor in which the number of constituent parts is reduced, possible causes of failure are eliminated, and the degree of inconvenience encountered during the assembly is lessened.

Another and more specific object of the present invention is to provide a motor comprising: a stator for producing a predetermined magnetic field in the interior of a motor case having one open end; a rotor rotatably provided inside the motor case so as to rotate by interacting with the magnetic field produced by the stator; brush arms which is held by a motor cover closing the open end of the motor case, and which supplies a current to the rotor; and connection holes which, provided in the motor cover, allows connection surfaces of the brush arms to touch a hypothetical curved surface extending from the inner wall of the holes, respectively, and which allows external circuit terminals to be inserted therein so as to allow the side of the external circuit terminals to be connected with the connection surfaces of the brush arms.

According to the motor of the present invention, it is possible to establish a direct electrical connection between the brush arm and the external circuit terminal via the connection hole. Hence, the number of constituent parts can be reduced. Moreover, the brush arm is exposed outside inside the connection hole so as to come into contact with the external circuit terminal inserted into the connection hole. Hence, it is possible to establish an electrical connection while the brush arm is being held.

Still another and more specific object of the present invention is to provide a motor comprising: a stator for producing a predetermined magnetic field in the interior of a motor case having one open end; a rotor rotatably provided inside the motor case so as to rotate by interacting with the magnetic field produced by the stator; brush arms which is held by a motor cover closing the open end of the motor case, and which supplies a current to the rotor; an electric element having a connection surface; an electrical element holder which, provided in the motor cover, holds the electrical element such that a first connection surface of the electrical element is connected with the brush arm, and a second connection surface of the electrical element is in direct contact with an external circuit terminal.

According to this aspect of the present invention, only a minimum number of components are required to construct a motor having an electrical element built in, wherein the electrical element is held in an electrical element holding part, a brush is connected to a first surface of the electrical element, and a second surface of the electrical element is exposed outside the motor so as to be connected with the external circuit terminal.

BRIEF DESCRIPTION OF THE PREFERRED EMBODIMENTS

Other objects and further features of the present invention will be apparent from the following detailed description when read in conjunction with the accompanying drawings in which.

DESCRIPTION OF THE PREFERRED EMBODIMENTS

Figure 1:
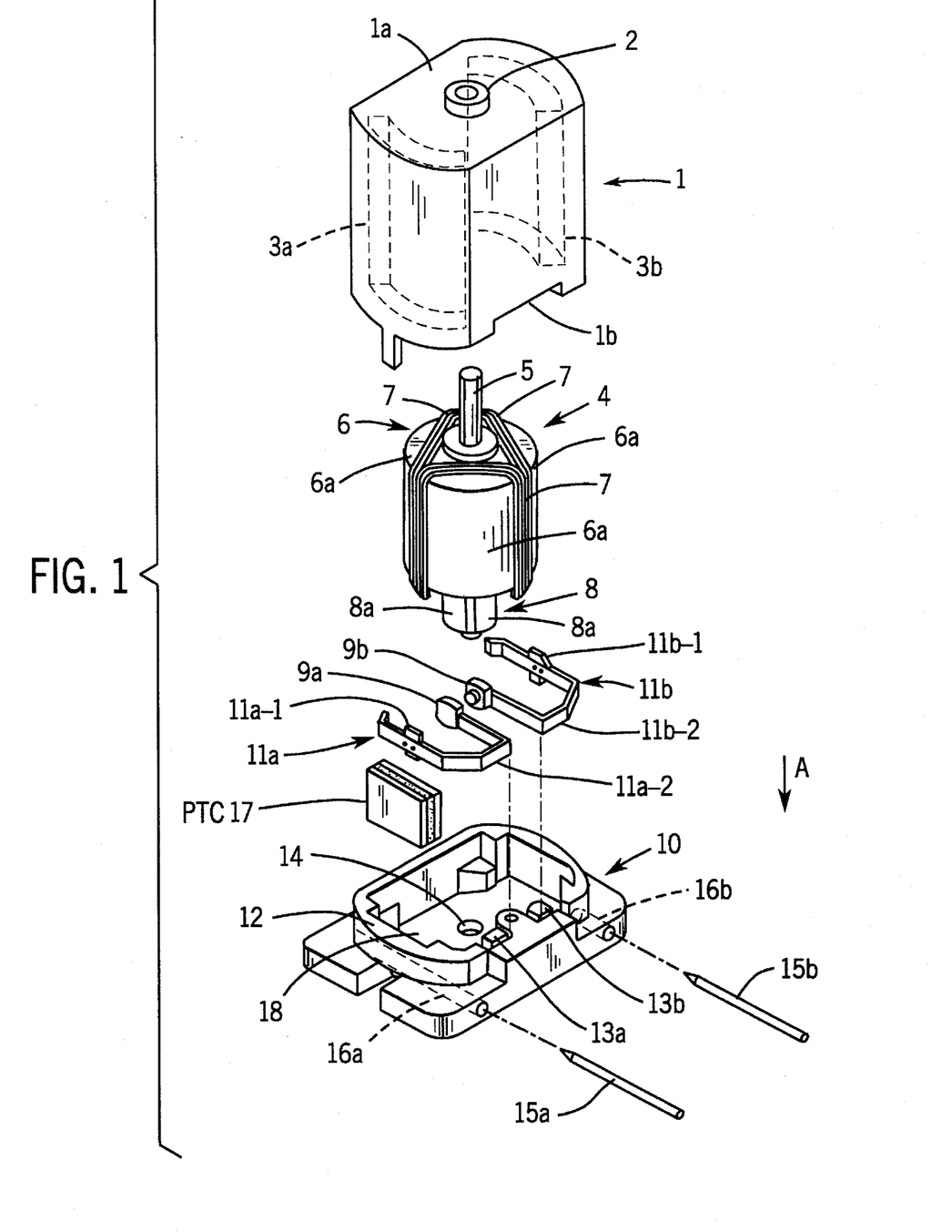
FIG. 1 is an illustration of the construction of a first embodiment of the present invention.
Figure 2:
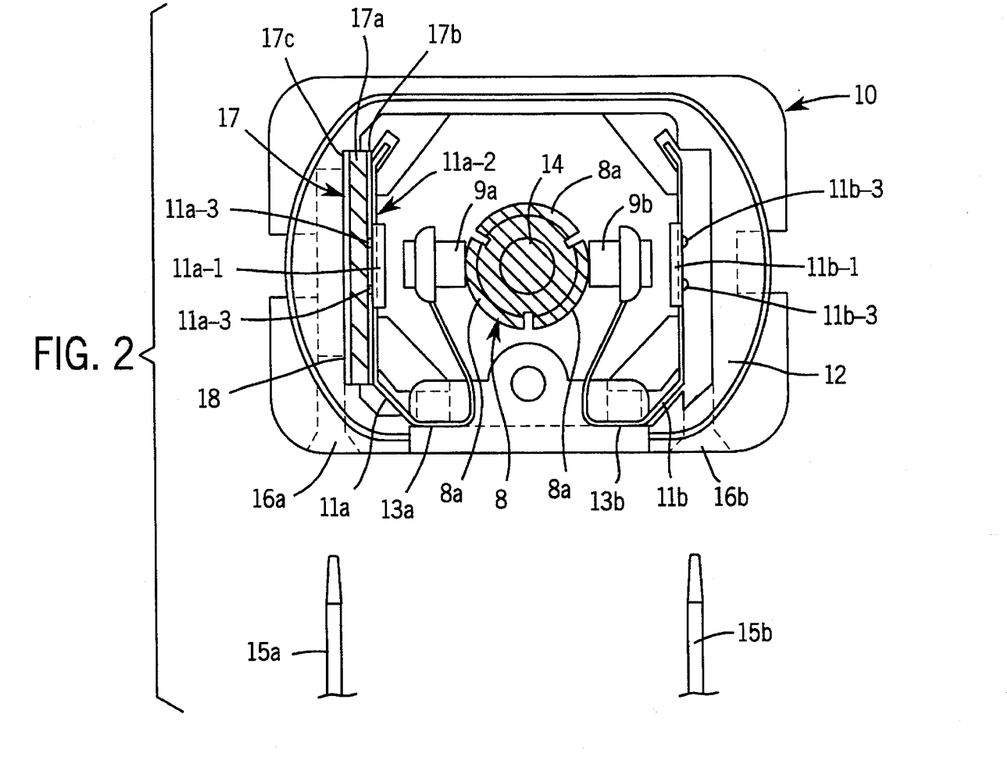
FIG. 2 is an illustration of the construction of an essential part of the construction of the first embodiment.

FIG. 1 shows the construction of a first embodiment of the present invention. FIG. 2 shows the construction of an essential part of the first embodiment of the present invention. A motor case 1 is formed of a magnetic material and has the shape of a cylinder which has bottom. A bottom 1a of the motor case 1 is provided with a bearing 2.

A pair of permanent magnets 3a and 3b which together serve as a stator are fixed to the inner wall of the motor case 1. The pair of permanent magnets 3a and 3b are fixed to the inner wall of the motor case 1 such that magnetic poles of opposite polarities are directly opposite each other, so that a uniform magnetic field is produced in the motor case 1. A receding part 1b is formed at a side of the motor case 1. The receding part 1b is engaged with a motor cover 10 so that the position of the motor case 1 and the motor cover 10 can be accurately positioned with respect to each other.

Rotatably held inside the motor case 1 is a rotor 4 which is rotated through interaction with the magnetic field produced by the permanent magnets 3a and 3b, which serve as a stator. The rotor 4 is formed of a spindle axis 5, a core 6, a coil 7, and a commutator 8.

The core 6 is formed of a magnetic material and fixed to the spindle axis 5. Three coil winding parts 6a are formed around the spindle axis 5 to be integral with the core 6, the core winding parts 6a extending outward at 120° intervals. A coil 7 is wound around each of the coil winding parts 6a. The coils 7 are connected in series, and each of the connecting points of the coils 7 is connected to the respective one of the three sliding slips 8a of the commutator 8.

The commutator 8 is fixed to the spindle axis 5 to be aligned with the core 6. In the commutator 8, the three sliding slips 8a are provided around the spindle axis 5a at 120° intervals from each other, there being a 60° displacement between each of the sliding slips and the adjacent coil winding part 6a of the core 6.

A pair of brushes 9a and 9b provided opposite each other are in contact with the commutator 8.

The brushes 9a and 9b are respectively fixed to the end of the brush arms 11a and 11b held by the motor cover 10, which closes the opening end of the motor case 1. The motor cover 10 is formed of an insulating material such as a resin and closes the opening end of the motor case 1 by being engaged with the opening end of the motor case 1. Also, the motor cover 1 rotatably holds that end of the spindle axis 5 of the rotor 4 which end is near the commutator 8.

The following components are formed in the motor cover 10 to be integral therewith: an engagement part 12 which is engaged with the end face of the motor case 1 adjacent the opening; arm holding parts 13a and 13b for holding the brush arms 11a and 11b; a bearing 14 for rotatably holding the spindle axis 5 of the rotor 4; holes 16a and 16b into which connecting wire bodies 15a and 15b are inserted for connection with the brush arms 11a and 11b; and a thermistor holding part 18 for holding a thermistor (PTC: Positive Temperature Coefficient Thermistor) 17 for protecting the motor from an excess current. The brush arms 11a and 11b are formed such that a conductive elastic body fabricated as a band is bent to form a substantially T shape. The brushes 9a and 9b are fixed to one end of the brush arms 11a and 11b, respectively, and connecting parts $11a_{-1}$ and $11b_{-1}$ are formed to be integral with the brush arms 11a and 11b, respectively. Bent corners $11a_{-2}$ and $11b_{-2}$ of the brush arms 11a and 11b are engaged with the arm holding parts 13a and 13b of the motor cover 10 so that the brush arms 11a and 11b are held in the motor cover 10.

The brush arms 11a and 11b are widest at the connecting parts $11a_{-1}$ and $11b_{-1}$. There are also provided projections $11a_{-3}$ and $11b_{-3}$ which project from the center of the connecting parts $11a_{-1}$ and $11b_{-1}$, respectively.

The connecting part $11b_{-1}$ of the brush arm 11b touches a hypothetical curved surface extending from the inner wall of the hole 16b when the brush arm 11b is held by the arm holding part 13b of the motor cover 10 so that the connecting part $11b_{-1}$ touches the side of the connecting wire body 15b, which serves as an external circuit terminal, is inserted into the hole 16b. The connecting part $11a_{-1}$ of the brush arm 11a touches a hypothetical surface marking the end of the PTC holding part 18 when the brush arm 11a is held by the arm holding part 13a of the motor cover 10 so that the connecting part $11a_{-1}$ is connected to the PTC 17.

The PTC 17 is formed such that contacts 17b and 17c are formed on either side of the a plate body 17a mainly composed of a ceramic or a carbon/resin composite material. The resistance of the PTC 17 increases as the temperature of itself or its environment increases. When the PTC 17 is held by the PTC holding part 18 formed in the motor cover 10, the contact 17b comes into contact with the connecting part $11a_{-1}$ of the brush arm 11a, and the contact 17c touches a hypothetical curved surface extending from the inner wall of the hole 16a.

When the connecting wire body 15a, which serves as an external circuit terminal, is inserted into the hole 16a, the contact 17c of the PTC 17 comes into contact with the side of the connecting wire body 15a so that an electrical connection is established between the rotor 4 and the external circuit via the PTC 17. The PTC 17 functions such that when the motor undergoes an overload and a large current is applied to the rotor 4, the temperature of the PTC 17 increases and the resistance of the PTC 17 increases, restraining the current supplied to the rotor 4 and preventing the motor from being burned.

The connecting wire bodies 15a and 15b are fixed, for example, by a solder, to a semiconductor substrate on which an electronic component forming a motor control circuit or the like is mounted.

It will be noted that, in the first embodiment described above, the brush arm 11a, which is elastically held in its position in such a manner as to urge the brush 9a toward the commutator 8 can, functions as an external circuit terminal by itself.

Further, the PTC 17 is held by the PTC holding part 18 of the motor cover 10 so that the contact 17b of the PTC 17 comes into contact with the connecting part $11a_{-1}$ of the brush arm 11a, while the contact 17c of the PTC 17 serves as an external circuit terminal.

Accordingly, the construction of this embodiment makes it possible to establish an electrical connection between the rotor and the external circuit without providing extra terminal components for connection with the external circuit terminal. This has a benefit of eliminating possible causes for a failure. Moreover, the cost of the motor is reduced, and the assembly becomes easy.

Further, it is possible to automate the assembly since the brush arms 11a and 11b, the PTC 17 can all be introduced in the A direction so as to be engaged with the respective holding parts 13a, 13b and 18.

Figure 3:
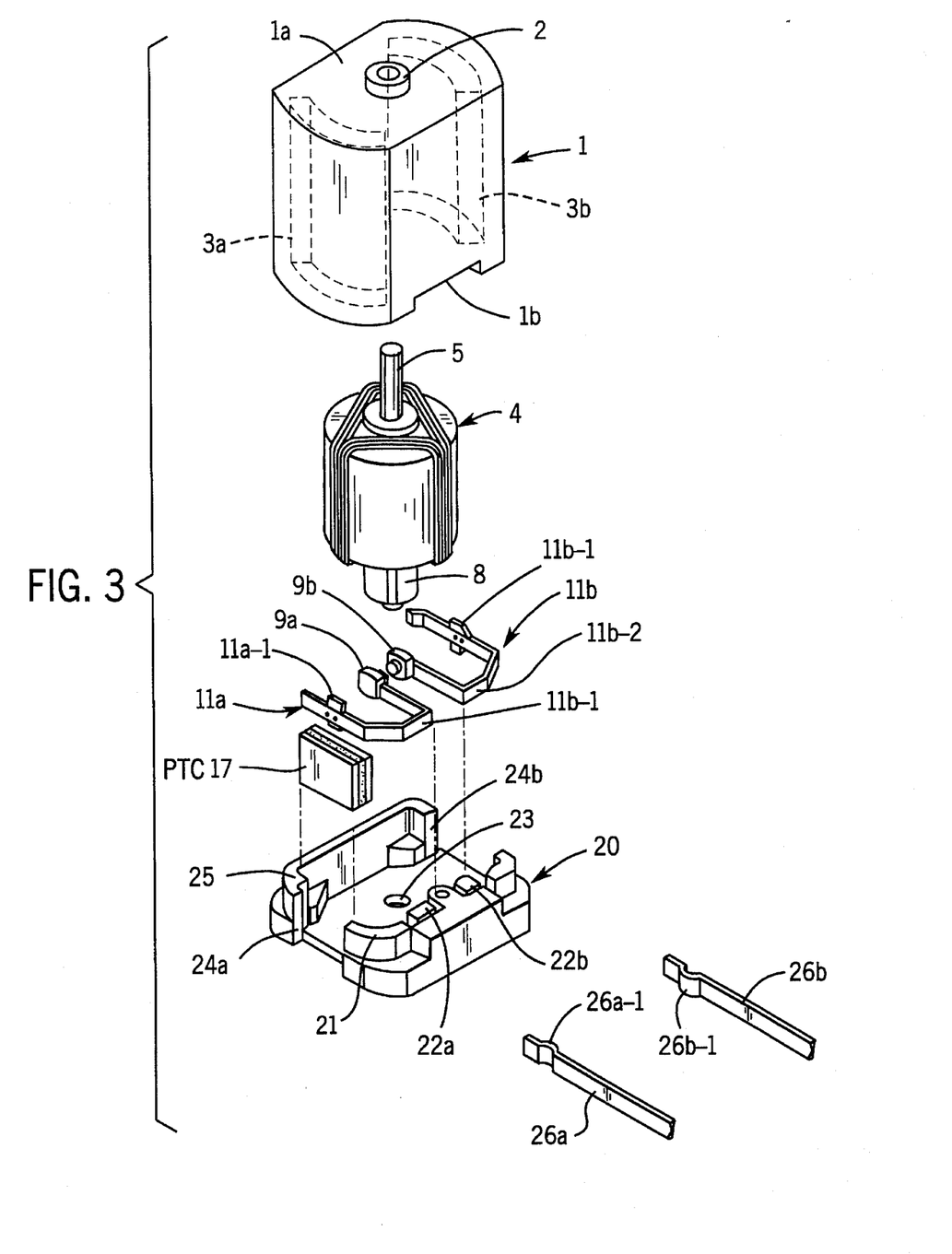
FIG. 3 is an illustration of the construction of a second embodiment.
Figure 4:
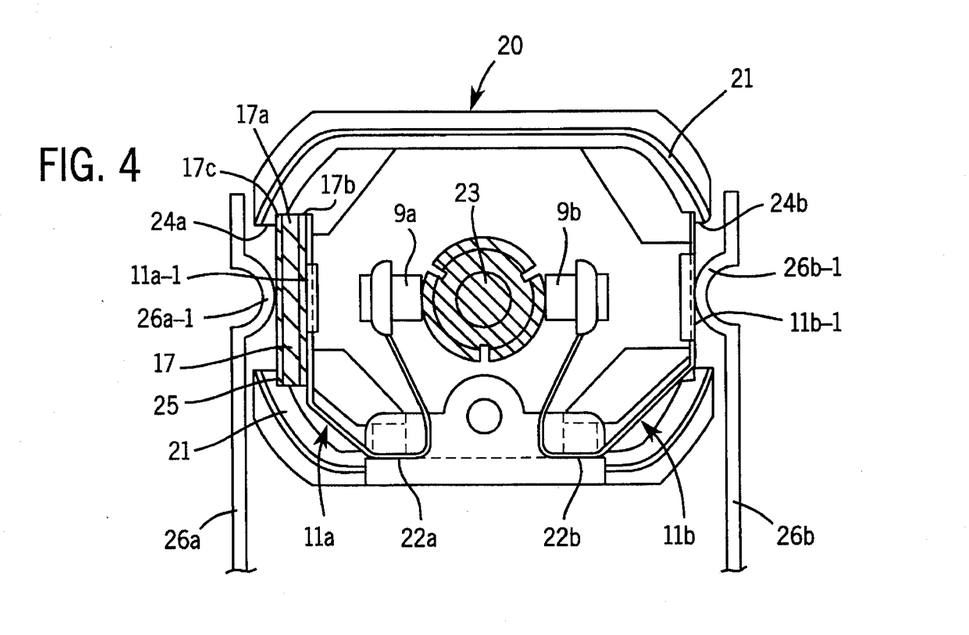
FIG. 4 is an illustration of the construction of an essential part of the second embodiment.

FIG. 3 shows the construction of a second embodiment of the present invention. FIG. 4 shows the construction of an essential part of the second embodiment. In FIGS. 3 and 4, those components that are the same as the components of FIGS. 1 and 2 are designated by the same reference numerals, and the description thereof is omitted.

The following components are formed in a motor cover 20 of the second embodiment to be integral therewith: an engagement part 21 which is engaged with the end face of the motor case 1 adjacent the opening so as to fix the motor cover 20 to the motor case 1; arm holding parts 22a and 22b for holding the brush arms 11a and 11b; a bearing 23 for rotatably holding the spindle axis 5 of the rotor 4; connection openings 24a and 24b which allows connection parts of the motor to be connected to the external circuit terminal; and a PTC holding part 25 for holding the PTC 17. A portion of the contact 17c is exposed outside the connection opening 24a of the motor cover 20 when the PTC 17 is held in the PTC holding part 25.

The connecting part $11a_{-1}$ of the brush arm 11a touches a hypothetical surface marking the end of the PTC holding part 25 when the brush arm 11a is held by the arm holding part 22a of the motor cover 20 so that the connecting part $11a_{-1}$ is connected to the contact 17b of the PTC 17 when the PTC 17 is held by the PTC holding part 25. A portion of the side of the brush arm 11b is exposed outside the connection opening 24b of the motor cover 20.

Connecting parts 26a and 26b, which serve as external circuit terminals, are held parallel to each other in such a manner as to sandwich the motor cover 20. Projections $26a_{-1}$ and $26b_{-1}$ which project inward are provided at the end of the connecting parts 26a and 26b, respectively, to be integral therewith.

An electrical connection between the rotor and the external circuit is established such that the projections $26a_{-1}$ and $26b_{-1}$ are made to directly face the connection openings 24a and 24b, respectively, so as to sandwich the motor cover 20 by means of the connecting parts 26a and 26b.

Since the second embodiment eliminates the need to provide terminal components like the first embodiment, the same effect as that of the first embodiment can be achieved.

While the description of the first and second embodiments assumes the use of the PTC 17 as an electrical element for preventing the motor from being burned, other elements, such as a resistive element and a semiconductor element, may also be employed.

In one conceivable construction, a resistive element formed into a plate is employed to adjust the characteristic of the motor's rotational drive force and the like by restraining the current fed to the rotor 4. In this conceivable construction, a desired rotational drive force can be obtained only by adjusting the resistance of the resistive element in accordance with the desired rotational drive force. Various levels of rotational drive force can be obtained without the need for a troublesome operation such as a modification of the specification for the coil windings.

Motors for use in an automobile usually come in two types: those operating on 12 V and those operating on 24 V. Conventionally, the specification for the coil windings of the motor, such as the specification for the number of turns of the coil, is modified to comply with these two specifications of the motor. According to the second embodiment of the present invention, it is possible to comply with the different specifications of the motor only by replacing the resistive elements. Thus, the same motor can be used as a 24 V motor and a 12 V motor. Hence, the reduction of the cost can be achieved.

Figure 5:
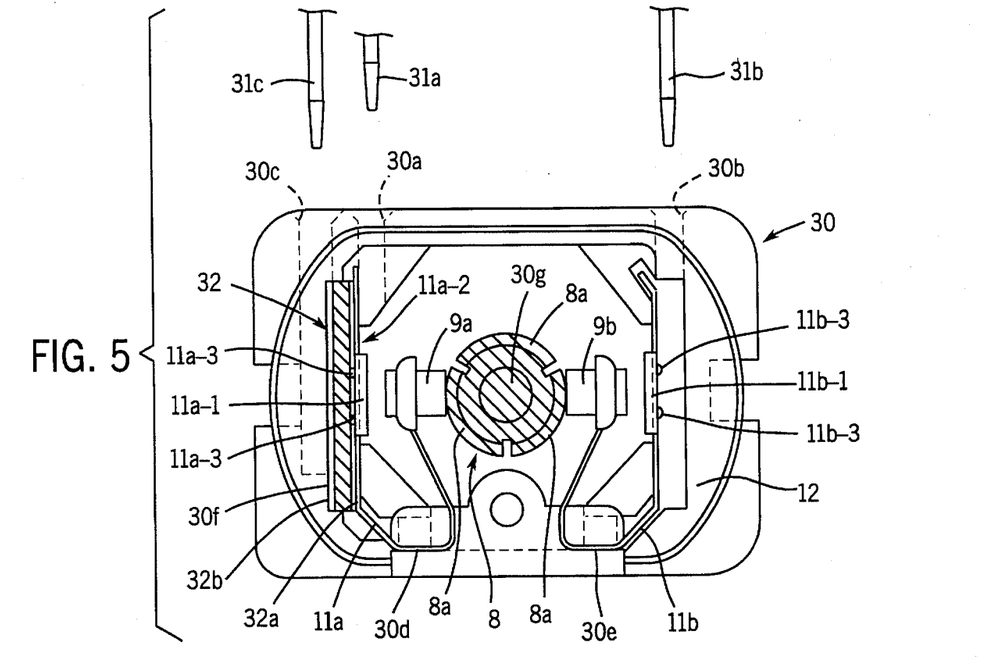
FIG. 5 is an illustration of the construction of a third embodiment.

FIG. 5 shows the construction of a third embodiment. In the figure, those components that are the same as the components of FIG. 1 are designated by the same reference numerals, and the description thereof is omitted.

The following components are formed in the motor cover 30 to be integral therewith: connecting holes 30a and 30b into which external circuit connection lines 31a and 31b which supply power for driving the motor are inserted; a connection hole 30c to which an external circuit connection line 31c for inspecting the operation of the motor; arm holding parts 30d and 30e for holding the brush arms 11a and 11b formed in substantially the same manner as the brush arms of the first embodiment; a resistance holding part 30f for holding a resistive element 32; and a bearing 30g for rotatably holding the spindle axis 5 of the rotor 4.

The brush arm 11a and the resistive element 32 are held by the arm holding part 30d and the resistance holding part 30f, respectively, like the brush arm 11a and the PTC 17 of the first embodiment. A first side of the brush arm 11a comes into contact with a side 32a of the resistive element 32. A second side of the brush arm 11a touches a hypothetical curved surface extending from the inner wall of the connection hole 30a, and a first side of the brush arm 11b touches a hypothetical curved surface extending from the inner wall of the connection hole 30b. A side 32b of the resistive element 32 touches a hypothetical curved surface extending from the inner wall of the connection hole 30c.

The external circuit connection lines 31a and 31b are inserted into the connection holes 30a and 30b, respectively, so as to be connected to the brush arms 11a and 11b, respectively. The external circuit connection line 31c is inserted into the connection hole 31c so as to be connected to the brush arm 11a via the resistive element 32.

A motor driving voltage is applied between the external circuit connection lines 31a and 31b so that the motor is driven.

As the external circuit connection line 31c is connected to the brush arm 11a via the resistive element 32, a signal varying in accordance with the rotation of the motor can be obtained. When the motor is forcefully prevented from rotating even when the driving voltage is applied, the impedance of the rotor 4 is small, and the signal obtained via the external circuit connection line 31c is at a low level. When the motor is driven normally, the impedance of the rotor is great, and the signal obtained via the external circuit connection line 31c is at a high level.

Thus, the rotation of the motor can be inspected by observing the variation of the level of the signal obtained via the external circuit connection line 31c. By controlling the power supplied to the external circuit connection line 31c in accordance with the level of the signal obtained via the external circuit connection line 31c, the motor can be prevented from burning.

In addition to the effects of the first and second embodiments, the third embodiment has an effect that it possible to inspect the rotation of the motor.

While connection holes 31a–31c, which are similar to the connection holes of the first embodiment, are employed to connect the external circuit with the rotor, other means for connection, such as the openings of the second embodiment, may also be used.

Figure 6:
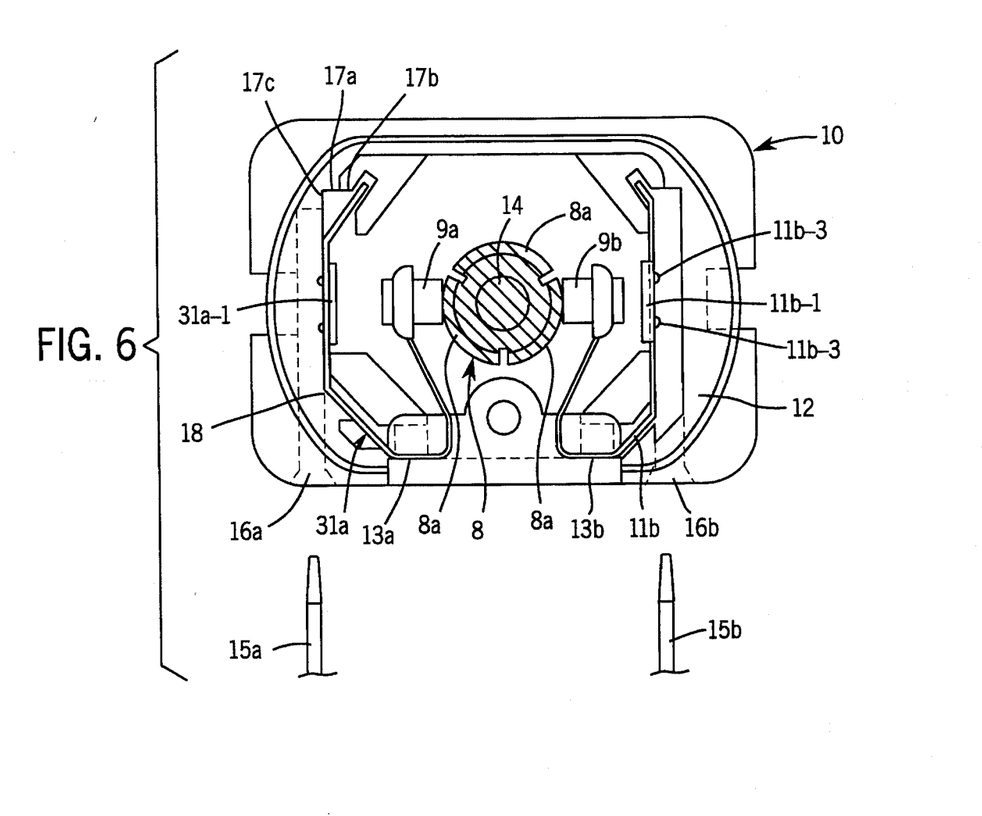
FIG. 6 is an illustration of the construction of a fourth embodiment.

FIG. 6 shows the construction of an essential part of a fourth embodiment.

In the figure, those components that are the same as the components of FIGS. 1 and 2 are designated by the same reference numerals, and the description thereof is omitted.

The motor according to the sixth embodiment is a variation of the motor of the first embodiment, a difference being that the PTC 17 is not provided. A brush arm 31a of the sixth embodiment and the brush arm 11a are dissimilarly configured. As a result of the PTC 17 not being provided, a connecting part $31a_{-1}$ of the brush arm 31a is different from the connecting part $11a_{-1}$ in that the connecting part $31a_{-1}$ projects into the PTC holding part 18 and touches a hypothetical curved surface extending from the inner wall of the hole 16a.

According to the above described construction, the connecting part $31a_{-1}$ of the brush arm 31a comes into contact with the side of the connecting wire body 15a so that a direct electrical connection between the rotor and the external circuit can be established. In this way, the construction of the motor is simplified, the assembly and mounting of the motor can be performed more easily, and the motor can be made more compact.

Figure 7:
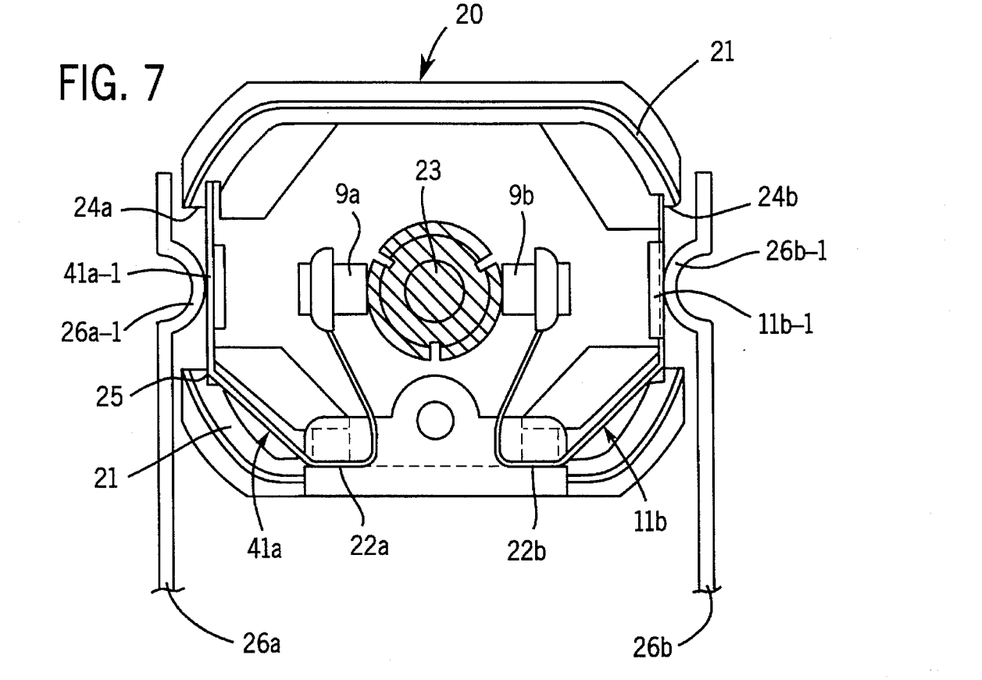
FIG. 7 is an illustration of the construction of a fifth embodiment.

FIG. 7 shows the construction of a fifth embodiment of the present invention. In the figure, those components that are the same as the components of FIGS. 3 and 4 are designated by the same reference numerals, and the description thereof is omitted.

The motor of the fifth embodiment is a variation of the motor of the second embodiment, a difference being in that the PTC 17 is not provided. As a result of the PTC 17 not being provided, a brush arm 41a of the second embodiment differs from the brush arm 11a of the first embodiment in that a connecting part $41a_{-1}$ of the brush arm 41a projects into the PTC holding part 25 and is exposed outside the connection opening 24a.

According to the above construction, the projection $26a_{-1}$ of the connecting part 26a can be directly connected to the connecting part $41a_{-1}$ of the brush arm 41a, thereby achieving a direct connection between the rotor and the external circuit. As in the case of the third embodiment, the construction of the motor can be simplified, the assembly and mounting of the motor can be performed more easily, and the motor can be made more compact.

While it is assumed, in the description of the first through fifth embodiments, that both of the connecting parts, that is, the connecting parts 15a and 15b, as well as the connecting parts 26a and 26b, serve as the external circuit terminals, only one of the pair of connecting parts may have the construction as described.

Figure 8:
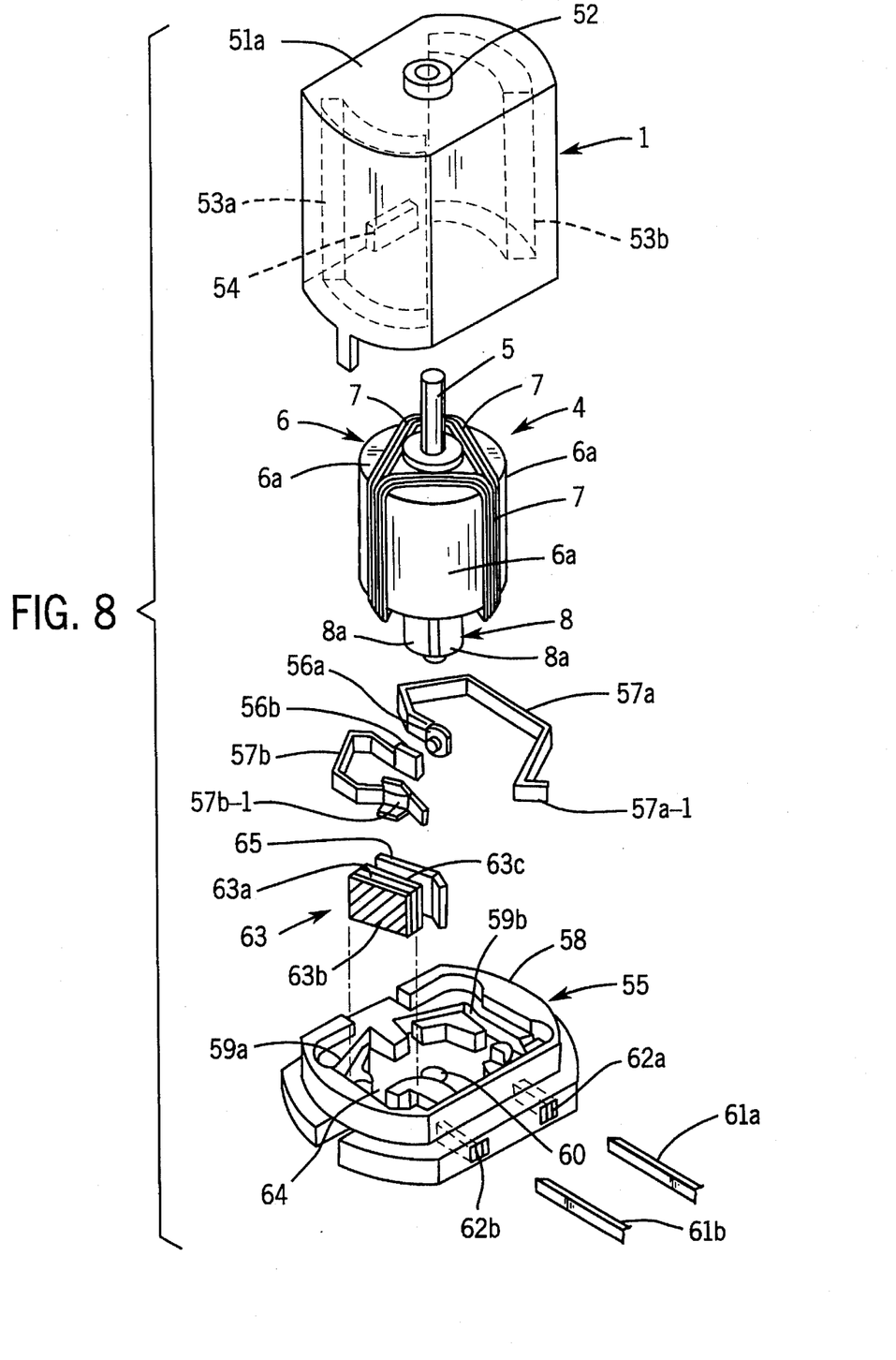
FIG. 8 is an illustration of the construction of a sixth embodiment.
Figure 9:
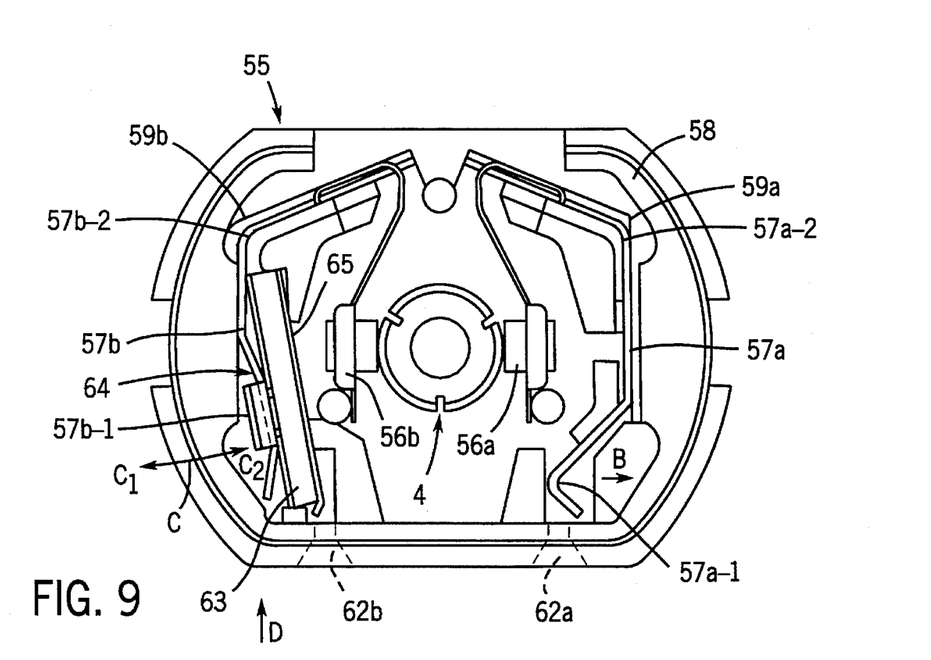
FIG. 9 is an illustration of the construction of an essential part of the sixth embodiment.

FIG. 8 shows the construction of a sixth embodiment of the present invention. FIG. 9 shows the construction of an essential part of the sixth embodiment. In the figures, those components that are the same as the components of FIGS. 1 and 2 are designated by the same reference numerals, and the description thereof is omitted.

A motor case 51 is formed of a magnetic body having a cylindrical configuration. A bearing 52 is fixed to a bottom 51a of the motor case 51. A pair of permanent magnets 53a and 53b, which together serve as a stator, are attached to the inner wall of the motor case 51 so as to produce a uniform magnetic field inside the motor case 51. A receding part 54 for use in positioning the motor 51 with respect to a motor cover 55 is provided at the side of the motor 51.

Brushes 56a and 56b are fixed opposite each other at the respective ends of brush arms 57a and 57b held by the motor cover 55 which covers the opening of the motor case 51, the brushes 56a and 56b being in contact with the commutator 8. The motor cover 55 formed of an insulating body such as a resin is engaged with the opening of the motor case 51 and closes the opening of the motor case 51. The motor cover 55 also rotatably hold the commutator 8 end of the spindle axis 5.

The following components are formed in the motor cover 55 to be integral therewith: an engagement part 58 which is engaged with the end face of the motor case 51 adjacent the opening; arm holding parts 59a and 59b for holding the brush arms 57a and 57b; a bearing 60 for rotatably holding the spindle axis 5 of the rotor 4; holes 62a and 62b into which connecting plate bodies 61a and 61b, which serve as external circuit terminal, are inserted for connection with the brush arms 57a and 57b; and a thermistor holding part 64 for holding a thermistor (PTC: Positive Temperature Coefficient Thermistor) 63 for protecting the motor from an excess current as well as holding the connecting plate body 61b. The brush arms 57a and 57b are formed such that a conductive elastic body fabricated as a band is bent. The brushes 56a and 56b are fixed to one end of the brush arms 57a and 57b, respectively, and connecting parts $57a_{-1}$ and $57b_{-1}$ are formed at the other end to be integral with the brush arms 57a and 57b, respectively. Bent corners $57a_{-2}$ and $57b_{-2}$ of the brush arms 57a and 57b are engaged with the arm holding parts 59a and 59b of the motor cover 55 so that the brush arms 57a and 57b are held in the motor cover 10.

The connecting part $57b_{-1}$ of the brush arm 57b is bent to protrude toward the hole 62a. When the connecting plate body 61a is inserted into the hole 62a, the connecting part $57b_{-1}$ is elastically deformed in the B direction indicated by the arrow and pressed against the connecting plate body 61a so as to be in contact therewith along a line.

The connecting part $57b_{-1}$ of the brush arm 57b is located at the wall of the thermistor holding part 64 when the brush arm 57b is held by the arm holding part 57b of the motor cover 55. When the thermistor 63 is held in the thermistor holding part 64, the connecting part $57b_{-1}$ is elastically deformed in the $C_1$ direction indicated by the arrow so that the connecting part $57b_{-1}$ is pressed against one side of the thermistor 63. A conductive plate body 65 is provided on a contact 63c of the PTC 63.

The PTC 63 is formed such that contacts 63b and 63c are formed on either side of the a plate body 63a mainly composed of a ceramic or a carbon/resin composite material. The resistance of the PTC 63 increases as the temperature of itself or its environment increases.

The conductive plate body 65 is formed to have a surface which is substantially of the same configuration as that of the contacts 63b and 63c. The conductive plate body 65 is disposed parallel to the surface of the contact 63c of the thermistor 63 and so that there is an electric connection with the contact 63c, which is held in the thermistor holding part 64 together with the thermistor 63. The conductive plate body 65 also protects the contact 63c. The end of the conductive plate body 65 which is positioned adjacent the hole 62b is bent toward the thermistor 63.

Thermistor 63 and the conductive plate body 65 are held in the thermistor holding part 64 such that the end of the conductive plate body 65 adjacent the hole 62b projects toward a space created by extending the inner wall of the hole 62b. The thermistor 63 and the conductive plate body 65 are held by the elastic force of the brush arm 57b such that they can be moved in the $C_1$ direction when a force greater than the elastic force of the brush arm 57b is exerted.

Figure 10A:
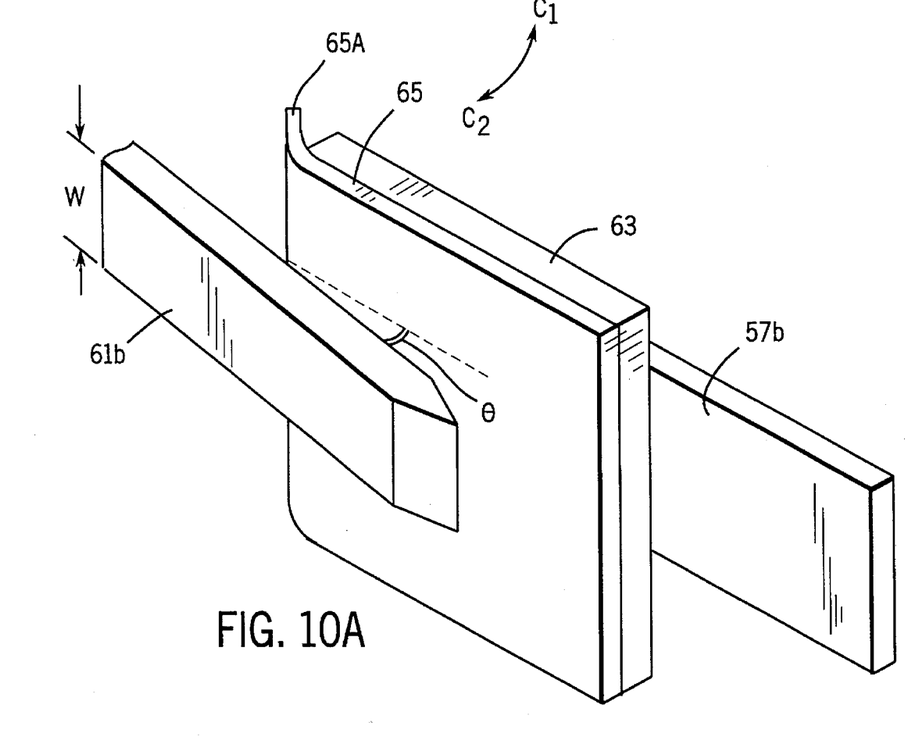
FIGS. 10A and 10B are an illustration of the operation of the sixth embodiment.
Figure 10B:
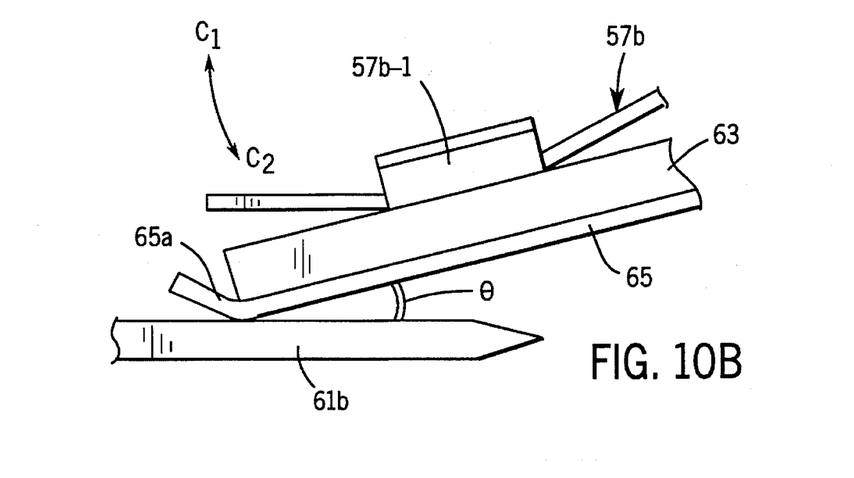

FIG. 10 shows how the conductive plate body 65 and the connecting plate body 61b are connected with each other when the connecting plate body 61b is inserted into the hole 62b. When the connecting plate body 61b is inserted into the hole 62b, the side of the connecting plate body 61b comes into contact with the conductive plate body 65 by being guided by a bent part 65a at the end of the conductive plate body 65. Since the end of the connecting plate body 61b is tapered, the tapered portion functions in cooperation with the bent part 65a so as to make the insertion more smooth.

The thermistor 63 and the conductive plate body 65 are moved in the $C_1$ direction against the elastic force of the brush arm 57b. Thus, the conductive plate body 65 and the connecting plate body 61b come into contact with each other with a force determined by the elastic force of the brush arm 57b.

The conductive plate body 65 and the connecting plate body 61b are in contact with each other at an angle θ. That is, the contact between the conductive plate body 65 and the connecting plate body 61b is a linear contact across the width W of the connecting plate body 61b. Thus, a force determined by the elastic force of the brush arm 56b is exerted on a portion of the connecting plate body 61b in a concentrated manner via the conductive plate body 65. Hence, the conductive plate body 65 and the connecting plate body 61b are in a close contact with each other.

The above construction prevents the thermistor 63 from being scratched by the conductive plate body 65 since the connecting plate body 61b is connected to the thermistor 63 via the conductive plate body 65, and prevents the thermistor 63 from being damaged by a stress concentration.

The connecting plate bodies 61a and 61b are fixed by a solder or the like on a circuit board on which electronic components for forming a motor control circuit or the like are mounted.

As has been described, the conductive plate body 65 becomes in contact with the side of the connecting plate body 15a when the connecting plate body 61b, which serves as an external circuit terminal, is inserted into the hole 62b so that an electric connection is established between the rotor 4 and the external circuit via the PTC 63. The PTC 63 functions such that, when the motor suffers a overload and a large current is fed to the rotor 4, the temperature of the PTC 63 increases so that the resistance of the PTC 63 increases, restraining the current fed to the rotor 4 and preventing the motor from being burned.

In addition to the effects of the first embodiment, this embodiment has an effect that the connection between the connective plate body 61b and the thermistor 63 can be made satisfactory.

The present invention is not limited to the above described embodiments, and variations and modifications may be made without departing from the scope of the present invention.

What is claimed is:

1. A motor comprising:

a stator for producing a predetermined magnetic field in the interior of a motor case having one open end;

a rotor rotatably provided inside said motor case so as to rotate by interacting with the magnetic field produced by said stator;

a pair of brush arms which are held by a motor cover closing the open end of said motor case, and which supply a current to said rotor;

connection holes extending into said motor cover for receiving elongated external circuit terminal members, one of said brush arms having a connecting surface portion exposed in one of said connection holes along a portion of the length of said connection hole for engaging a side of one of said external circuit terminal members inserted in one of said connection holes to establish an electrical connection with said one of said external circuit terminal members;

an electric element having a pair of connection surfaces;

an electrical element holder provided in said motor cover for holding said electrical element such that a first connection surface of said electrical element is electrically connected with the other of said brush arms, and a second connection surface of said electrical element is positioned to engage a side of another external circuit terminal member inserted in the other of said connection holes to establish an electrical connection with said another of said external circuit terminal members.

2. The motor as claimed in claim 1, wherein said electrical element is a protective element which protects said rotor by restraining the current in response to the variation in the temperature of the motor.

3. The motor as claimed in claim 2, wherein said electrical element is a resistive element.

4. The motor as claimed in claim 2, wherein said second connection surface of said electrical element further comprises a conductive plate body which establishes an electric connection between said another of said external circuit terminal members and said electrical element.

5. The motor as claimed in claim 2, wherein said other brush arm has an elastic force which urges said electrical element toward said another of said external circuit terminal members.

6. The motor as claimed in claim 1, wherein said electrical element is a resistive element.

7. The motor as claimed in claim 6, wherein said second connection surface of said electrical element further comprises a conductive plate body which establishes an electric connection between said another of said external circuit terminal members and said electrical element.

8. The motor as claimed in claim 6, wherein said other brush arm has an elastic force which urges said electrical element toward said another of said external circuit terminal members.

9. The motor as claimed in claim 1, wherein said second connection surface of said electrical element further comprises a conductive plate body which establishes an electric connection between said another of said external circuit terminal members and said electrical element.

10. The motor as claimed in claim 9, wherein said electrical element and said conductive plate body are formed such that an end of said conductive plate body comes into contact with said another of said external circuit terminals.

11. The motor as claimed in claim 10, wherein said other brush arm has an elastic force which urges said electrical element toward said another of said external circuit terminal members.

12. The motor as claimed in claim 9, wherein said other brush arm has an elastic force which urges said electrical element toward said another of said external circuit terminal members.

13. The motor as claimed in claim 1, wherein said other brush arm has an elastic force which urges said electrical element toward said another of said external circuit terminal members.

* * * * *